US005976424A

United States Patent [19]
Weber et al.

[11] Patent Number: 5,976,424
[45] Date of Patent: Nov. 2, 1999

[54] METHOD FOR MAKING MULTILAYER OPTICAL FILMS HAVING THIN OPTICAL LAYERS

[75] Inventors: Michael F. Weber, Shoreview; Carl A. Stover, St. Paul; William W. Merrill, White Bear Lake; Andrew J. Ouderkirk, Woodbury, all of Minn.

[73] Assignee: Minnesota Mining and Manufacturing Company, St. Paul, Minn.

[21] Appl. No.: 08/904,325

[22] Filed: Jul. 31, 1997

Related U.S. Application Data

[60] Provisional application No. 60/023,102, Jul. 31, 1996.

[51] Int. Cl.$^6$ .............................. B29D 11/00; B29C 47/06
[52] U.S. Cl. .............................. 264/1.6; 264/1.7; 264/1.9; 264/173.12; 264/173.15; 264/216
[58] Field of Search .............................. 264/1.6, 1.7, 1.9, 264/173.12, 173.15, 173.16, 216, 290.2

[56] References Cited

U.S. PATENT DOCUMENTS

| Re. 34,605 | 5/1994 | Schrenk et al. ..................... 359/359 |
| 3,051,452 | 8/1962 | Nobel . | |

(List continued on next page.)

FOREIGN PATENT DOCUMENTS

| 1327286 | 3/1994 | Canada . |
| 062751 | 10/1982 | European Pat. Off. . |
| 469732 | 2/1992 | European Pat. Off. . |
| 514223 | 11/1992 | European Pat. Off. . |
| 5-288910 | 11/1993 | Japan . |
| 6-11607 | 1/1994 | Japan . |
| WO 91/09719 | 7/1991 | WIPO . |
| WO 94/10589 | 5/1994 | WIPO . |
| WO 95/17303 | 6/1995 | WIPO . |
| WO 95/17691 | 6/1995 | WIPO . |
| WO 95/17692 | 6/1995 | WIPO . |
| WO 95/17699 | 6/1995 | WIPO . |
| WO 96/19347 | A | 6/1996 | WIPO . |
| WO 97/01774 | 1/1997 | WIPO . |

OTHER PUBLICATIONS

Schrenk, W. et al., "Coextruded Elastomeric Optical Interference Film", SPE Annual Technical Conference, Atlanta, GA, pp. 1703–1707 (1988).

Schrenk, W. et al., "Coextruded Infrared Reflecting Films", 7th Annual Meeting Polymer Processing Society, Hamilton, Ontario, Canada, pp. 222–223 (Apr. 1991).

Schrenk, W. et al., "Coextruded Iridescent Film", TAPPI Paper Synthetics Conference, Atlanta, Georgia, pp. 141–145 (Sep. 27–29 1976).

Im, J. et al., "Coextruded Microlayer Film and Sheet", *Journal of Plastic Film and Sheeting*, vol. 4, pp. 104–115 (Apr., 1988).

Schrenk et al., "Coextruded Multilayer Polymer Films and Sheet", Chapt. 15, Polymer Blends, vol. 2, 129, Academic Press, Inc. (1978).

Hodgkinson, I. et al., "Effective Principal Refractive Indices and Column Angles for Periodic Stacks of Thin Birefringent Films", *J. Opt. Soc. Am. A*, vol. 10, No. 9, pp. 2065–2071 (1993).

Pollock, et al., "Interdiffusion in Microlayered Polymer Composites of Polycarbonate and a Copolyester", *Journal of App. Polymer Science*, vol. 52, pp. 163–176 (1994).

Schrenk et al., "Interfacial Flow Instability in Mulilayer Coextrusion", *Polymer Engineering and Science*, vol. 18 (8), pp. 620–623 (Jun. 1978).

Schrenk, W., "New Developments in Coextrusion", International Conference on Advances In Polymer Processing, New Orleans, Louisiana, (Apr., 1991).

(List continued on next page.)

*Primary Examiner*—Mathieu D. Vargot
*Attorney, Agent, or Firm*—John A. Fortkort

[57] ABSTRACT

A method for making multilayer optical films is provided in which the degradation of the optical extinction of the thinnest optical layers is avoided by casting these layers close to the casting wheel.

34 Claims, 8 Drawing Sheets

| PBL #5 | |
| --- | --- |
| | Packet #4 |
| PBL #4 | |
| | Packet #3 |
| PBL #3 | |
| | Packet #2 |
| PBL #2 | |
| | Packet #1 |
| PBL #1 | |

U.S. PATENT DOCUMENTS

| | | |
|---|---|---|
| 3,051,453 | 8/1962 | Sluijters . |
| 3,182,965 | 5/1965 | Sluijters . |
| 3,195,865 | 7/1965 | Harder . |
| 3,308,508 | 3/1967 | Schrenk . |
| 3,315,306 | 4/1967 | Ladner et al. . |
| 3,321,804 | 5/1967 | Breidt, Jr. et al. . |
| 3,327,349 | 6/1967 | Lennox . |
| 3,334,382 | 8/1967 | Lefevre . |
| 3,397,428 | 8/1968 | Donald . |
| 3,399,105 | 8/1968 | Breidt, Jr. et al. . |
| 3,400,190 | 9/1968 | Donald . |
| 3,415,920 | 12/1968 | Lee et al. . |
| 3,423,498 | 1/1969 | Lefevre . |
| 3,442,755 | 5/1969 | Walters et al. . |
| 3,448,183 | 6/1969 | Chisholm . |
| 3,479,425 | 11/1969 | Lefevre et al. . |
| 3,480,502 | 11/1969 | Schrenk ................... 156/271 |
| 3,487,505 | 1/1970 | Chisholm et al. . |
| 3,511,903 | 5/1970 | Glass et al. . |
| 3,549,405 | 12/1970 | Schrenk et al. . |
| 3,555,128 | 1/1971 | Schrenk . |
| 3,557,265 | 1/1971 | Chisholm et al. . |
| 3,565,985 | 2/1971 | Schrenk et al. . |
| 3,576,707 | 4/1971 | Schrenk et al. . |
| 3,579,416 | 5/1971 | Schrenk . |
| 3,610,729 | 10/1971 | Rogers . |
| 3,645,837 | 2/1972 | Chisholm et al. . |
| 3,647,612 | 3/1972 | Schrenk et al. . |
| 3,687,589 | 8/1972 | Schrenk ................... 425/109 |
| 3,711,176 | 1/1973 | Alfrey, Jr. et al. . |
| 3,716,612 | 2/1973 | Schrenk et al. ................... 264/241 |
| 3,737,263 | 6/1973 | Schrenk et al. . |
| 3,743,459 | 7/1973 | Schrenk et al. . |
| 3,759,647 | 9/1973 | Schrenk et al. . |
| 3,773,882 | 11/1973 | Schrenk . |
| 3,801,429 | 4/1974 | Schrenk et al. . |
| 3,847,585 | 11/1974 | Chisholm ................... 65/99 |
| 3,860,036 | 1/1975 | Newman, Jr. . |
| 3,860,372 | 1/1975 | Newman, Jr. ................... 425/133.1 |
| 3,884,606 | 5/1975 | Schrenk . |
| 3,924,990 | 12/1975 | Schrenk ................... 425/131.1 |
| 4,094,947 | 6/1978 | Alfrey, Jr. et al. . |
| 4,162,343 | 7/1979 | Wilcox et al. ................... 428/212 |
| 4,310,584 | 1/1982 | Cooper et al. ................... 428/212 |
| 4,393,194 | 7/1983 | Gaudiana et al. ................... 528/348 |
| 4,446,305 | 5/1984 | Rogers et al. ................... 528/348 |
| 4,520,189 | 5/1985 | Rogers et al. ................... 528/331 |
| 4,521,588 | 6/1985 | Rogers et al. ................... 528/363 |
| 4,525,413 | 6/1985 | Rogers et al. ................... 428/212 |
| 4,540,623 | 9/1985 | Im et al. ................... 428/220 |
| 4,627,138 | 12/1986 | Im ................... 29/25.35 |
| 4,636,442 | 1/1987 | Beavers et al. ................... 428/480 |
| 4,643,927 | 2/1987 | Luecke et al. ................... 428/36 |
| 4,661,303 | 4/1987 | Chum et al. . |
| 4,756,953 | 7/1988 | Utsumi ................... 428/220 |
| 4,797,308 | 1/1989 | Mattin ................... 428/15 |
| 4,799,772 | 1/1989 | Utsumi . |
| 4,824,882 | 4/1989 | Nakamura et al. ................... 524/89 |
| 4,873,037 | 10/1989 | Chau et al. ................... 264/49 |
| 4,874,568 | 10/1989 | Chau et al. ................... 264/49 |
| 4,895,769 | 1/1990 | Land et al. ................... 428/483 |
| 4,937,134 | 6/1990 | Schrenk et al. ................... 428/213 |
| 4,963,304 | 10/1990 | Im et al. ................... 264/49 |
| 4,965,135 | 10/1990 | Im et al. ................... 428/412 |
| 5,059,356 | 10/1991 | Nakamura et al. ................... 252/585 |
| 5,077,121 | 12/1991 | Harrison et al. ................... 428/213 |
| 5,089,318 | 2/1992 | Shetty et al. ................... 428/212 |
| 5,094,788 | 3/1992 | Schrenk et al. . |
| 5,094,793 | 3/1992 | Schrenk et al. . |
| 5,095,210 | 3/1992 | Wheatley et al. ................... 250/339 |
| 5,103,337 | 4/1992 | Schrenk et al. ................... 359/359 |
| 5,122,905 | 6/1992 | Wheatley et al. ................... 359/586 |
| 5,122,906 | 6/1992 | Wheatley et al. ................... 359/586 |
| 5,126,880 | 6/1992 | Wheatley et al. . |
| 5,149,578 | 9/1992 | Wheatley et al. ................... 428/213 |
| 5,202,074 | 4/1993 | Schrenk et al. ................... 264/241 |
| 5,217,794 | 6/1993 | Schrenk . |
| 5,233,465 | 8/1993 | Wheatley et al. . |
| 5,234,729 | 8/1993 | Wheatley et al. ................... 428/30 |
| 5,269,995 | 12/1993 | Ramanathan et al. . |
| 5,278,694 | 1/1994 | Wheatley et al. ................... 359/359 |
| 5,316,703 | 5/1994 | Schrenk . |
| 5,339,198 | 8/1994 | Wheatly et al. ................... 359/359 |
| 5,360,659 | 11/1994 | Arends et al. ................... 428/216 |
| 5,389,324 | 2/1995 | Lewis et al. . |
| 5,424,119 | 6/1995 | Phillips et al. ................... 428/328 |
| 5,448,404 | 9/1995 | Schrenk et al. . |
| 5,451,449 | 9/1995 | Shetty et al. ................... 428/195 |
| 5,486,949 | 1/1996 | Schrenk et al. ................... 359/498 |
| 5,540,978 | 7/1996 | Schrenk . |
| 5,552,927 | 9/1996 | Wheatly et al. ................... 359/359 |
| 5,568,316 | 10/1996 | Schrenk et al. . |
| 5,759,467 | 6/1998 | Carter et al. ................... 264/290.2 |
| 5,783,120 | 7/1998 | Ouderkirk et al. ................... 264/1.9 |

OTHER PUBLICATIONS

Alfrey, Jr. et al., "Physical Optics of Iridescent Multilayered Plastic Films", *Polymer Engineering and Science,*, vol. 9, No. 6, pp. 400–404 (Nov. 1969).

Radford et al., "Reflectivity of Iridescent Coextruded Multilayered Plastic Films," *Polymer Engineering and Science,* vol. 13, No. 3, (May 1973); Dow Chemical Co., American Chemical Society Symposium on Coextruded Plastic Films, Fibers, Composites, Apr. 9–14, 1972.

| | |
|---|---|
| PBL #5 | |
| | Packet #4 |
| PBL #4 | |
| | Packet #3 |
| PBL #3 | |
| | Packet #2 |
| PBL #2 | |
| | Packet #1 |
| PBL #1 | |

Fig. 8

METHOD FOR MAKING MULTILAYER OPTICAL FILMS HAVING THIN OPTICAL LAYERS

CROSS REFERENCE TO RELATED APPLICATION

This application claims priority to U.S. Provisional patent application Ser. No. 60/023,102, filed on Jul. 31, 1996.

FIELD OF THE INVENTION

The present invention relates generally to methods for making optical films, and more specifically to a method for controlling the effects of interlayer diffusion when producing a multilayer optical film.

BACKGROUND OF THE INVENTION

In recent years, multilayer optical films have been developed which have a wide variety of interesting properties. Such films are described, for example, in U.S. Ser. No. 08/359,436, now abandoned. In the continuing development of these films, particular attention has been paid to maintaining the integrity of the multilayer structure in these films during manufacture, and to promoting interlayer adhesion between the individual layers. Good inter-layer adhesion between co-extruded layers in multilayer optical films is desirable to reduce the possibility of delamination during post-processing and end use. These aspects are crucial to the optical and mechanical properties of the film.

Material or layer characteristics that effect inter-layer adhesion and layer integrity include, but are not limited to, the relative affinity of the materials for each other (characterized by quantities such as solubility parameters, interaction parameters or interfacial tension), the ability of these materials to interact by chemical reaction, the roughness of the inter-layer interface (e.g., both local concentration fluctuations in the interfacial zone and the planarity of this zone), the broadness of the average concentration profile of the materials across the interfacial zone, the molecular weight distribution and average (or intrinsic) viscosity of the materials, the melt viscosities, normal stresses, the so-called "entanglement" weights of the materials, and the mobilities or diffusion coefficients of the materials. If the materials chemically react across the interface, inter-layer adhesion may be promoted by the creation of crosslinks or other forms of covalent bonding, including the formation of copolymers.

Inter-layer adhesion can also develop, and layer integrity can diminish, without chemical reaction. The higher the relative affinity between the materials of adjacent layers, the higher the inter-layer adhesion. If the affinity is sufficiently high, the materials become miscible, and the rate of interdiffusion then determines the final structure. When a multilayered structure is desired, excessive interdiffusion between miscible materials in adjacent layers can destroy the layered structure, and thus needs to be limited. Higher molecular weight can reduce interdiffusion, and can also limit ultimate miscibility.

If the affinity between the materials of adjacent layers is insufficient to cause miscibility, then an interfacial zone will develop over which the concentration of one material varies from nearly its pure value to nearly zero. Since materials are rarely perfectly immiscible, the concentration of the material in its original layer is likely to be somewhat less than its original value, and the concentration of the material in layers originally of other materials is likely to be somewhat greater than zero. In cases of partial miscibility, the initially pure material layers may tend to evolve toward thermodynamic phases that maintain a majority of the original material but also contain a substantial portion of material from neighboring layers. Partial miscibility may be the result of the lower molecular weight fractions inherent in, or added to, the polymeric material. As the affinity increases, the effective width of the interfacial zone increases and the ultimate purity of the layers decreases. Changing the purity of the layers can alter their behavior under subsequent processing (e.g., orientation and crystallization under draw) thus changing the optical and mechanical properties of the final film.

The width of the interfacial profile can also increase inter-layer adhesion. For example, a broader interface may be able to dissipate fracture energy more effectively, giving rise to increased strength. Moreover, weld strength correlates positively with the degree of inter-entanglement between layers. As the interfacial breadth decreases relative to the radius of gyration of a polymeric coil of the entanglement molecular weight, the weld strength is expected to decrease. Ultimate inter-entanglement, and thus inter-layer adhesion, between layers can also be increased by increasing the average molecular weight of the materials if the interfacial zone is broad enough relative to the size of the molecular coils. However, increasing the molecular weight can also slow interdiffusion and prevent the establishment of equilibrium. Finally, the interfacial profile necessarily establishes a gradient in the optical and mechanical properties throughout this interlayer region, thereby altering the properties of the construction in toto. As the interfacial zone width approaches the layer thickness, the layer integrity deteriorates with severe effects on the film properties. Thus, processing conditions and design considerations that effect these inter-layer characteristics are also clearly relevant.

Temperature and residence time can greatly affect the broadness of the average concentration profile of materials across the interfacial zone by affecting both interdiffusion and chemical reaction (where possible) between layers. Initially, the individual layers make contact in the feedblock and eventually weld in, or downstream of, this feedblock. Higher temperatures can increase the mutual welding and diffusion process which establishes the interfacial zone in situ. If the materials do not react and are immiscible, then there exists an equilibrium average concentration profile with some average interfacial zone width.

For given materials of given mobilities, processing temperatures and residence times determine how closely to equilibrium the interfacial zone can reach before web quenching at the casting wheel. If the materials can react, there exists a quasi-equilibrium at a given level of chemical reaction. As the reaction proceeds, this equilibrium can shift to a broader equilibrium profile. This latter case may include, but is not limited to, PEN:coPEN systems and other polyesters in which transesterification reactions can create co-polymers of the two initial materials in situ within the interfacial zone. The actual final interfacial profile between the layer compositions and the layer integrity are then the result of coupled diffusion and chemical reaction. Henceforth the term "interdiffusion" will imply both coupled processes. The interfacial profile resulting from interdiffusion can vary from a sharp boundary between distinct material layers through any intermediate stage up to and including profiles between layers at phase equilibrium. Because interlayer adhesion and layer integrity required for optical performance often behave oppositely in quality with degree of interdiffusion, processes may sometimes optimize at some intermediate interfacial profile.

In another example of process effects, melt train temperatures and drying conditions can affect the molecular weight distribution of the materials. Moreover, temperature and shear rate can effect the component layer viscosities which can, in turn, effect flow stability and inter-layer surface roughness. In some cases, relatively low levels of deliberate flow instability could conceivably enhance inter-layer adhesion without destroying the multilayer stack construction. Finally, process design considerations can also be important. For example, layers are compressed within the feedblock and then again within the die. An inter-layer profile established in the feedblock could be compressed in the die, requiring further interdiffusion to re-achieve the equilibrium interfacial width. Controlling residence times through the various portions of the melt train can control the degree of interdiffusion.

The effective index differentials of multilayered optical films are often observed to vary somewhat from the values predicted from the corresponding monolithic films. This variance is most pronounced in the thin optical layers (that is, those layers which are tuned to the blue region of the spectrum, or layers that are intentionally made less than ¼ wave thick for other regions of the spectrum). This phenomenon is sometimes attributed, at least in part, to interlayer diffusion. By way of illustration, as shown in FIG. 1, the index differential at 550 nm for monolithic films of PEN and coPEN stretched to a 6:1 ratio is about 0.25. However, from the measured reflectance of several ¼ wave optical stack samples of PEN/coPEN multilayer film, the effective index differential of the actual thin optical layers is somewhat smaller, typically about 0.20, and has been observed to drop to as low as 0.05. These variations in effective index differential adversely affect the optical properties of the film, with the result that reflective polarizers and other optical films made with these materials often attain only a fraction of their theoretical performance.

Various references describe films having thin optical layers or methods for making such films. Representative examples include U.S. Pat. Nos. 3,711,176 (Alfrey, Jr. et al.), 3,773,882 (Schrenk et al.), 3,884,606 (Schrenk), 5,126,880 (Wheatley et al.), 5,217,794 (Schrenk), 5,233,465 (Wheatley et al.), 5,269,995 (Ramanathan et al.), 5,316,703 (Schrenk), 5,389,324 (Lewis et al.), 5,448,404 (Schrenk et al.), 5,540,978 (Schrenk), and 5,568,316 (Schrenk et al.). However, to date, the conditions giving rise to variations in effective index differential have been only poorly understood, and no methods have been provided in the art for controlling such variations, particularly in films with thin optical layers. It is thus an object of the present invention to provide such a method.

SUMMARY OF THE INVENTION

In one aspect of the present invention, a method for making multilayer optical films having thin optical layers is provided in which degradation of the optical properties of the thin layers is avoided or minimized. In accordance with the method, the film is cast from a multilayer resin stream in such a way that the thinnest layers are within about 400 microns of a casting wheel or other casting surface. Surprisingly, it has been found that films produced in accordance with this method exhibit significantly less layer degradation in the thin optical layers as compared, for example, to films produced by casting the thin layers on the air side, despite the fact that the difference in cooling times for the air side versus the casting wheel side of the film is only on the order of seconds. Typically, the layers of greatest concern for the purposes of the present invention will be those having a thickness of less than about 10 microns. However, in specific applications, the thin layers of most concern may be those less than 2 or 1 microns thick or, in applications where the resulting optical film will need to reflect at least one polarization of light in the blue region of the spectrum, less than 0.5 microns thick.

In one embodiment of the invention, a multilayer optical film is made by extruding a first and second resin into a resin stream comprising a plurality of layers and having first and second major surfaces, wherein at least some of the plurality of layers comprise the first resin and at least some of the plurality of layers comprise the second resin. The resin stream is extruded in such a way that the number of layers having a layer thickness of less than k microns and disposed within 400 microns of the first surface is greater than the number of layers having a layer thickness of less than k microns and disposed within 400 microns of the second surface. The resin stream is then cast against a casting wheel or other casting surface such that the first major surface is in contact with the casting surface. In the event that it is desirable to have a significant number of thin layers are disposed within 400 microns of both the first and second major surfaces, the resin stream can be cast between opposing casting surfaces (e.g., opposing casting wheels) so that both first and second major surfaces are in contact with a casting surface. In various specific embodiments in accordance with the present invention, k has the value of 10, 2, 1, or 0.5, depending in part on the layer configuration involved and the extent to which the cast web is subsequently stretched.

In another embodiment of the invention, a method for making a multilayer optical film is provided in which first and second resins are extruded into a resin stream having a plurality of layers and having first and second major surfaces. At least some of the plurality of layers in the resin stream comprise the first resin, and at least some of the plurality of layers in the resin stream comprise the second resin. The resin stream is extruded in such a way that a first set having at least one member and consisting of the layers having layer thicknesses of less than k microns and disposed within 400 microns of the first major surface has at least as many members as a second set consisting of the layers having layer thicknesses of less than k microns and disposed within 400 microns of the second major surface, and in such a way that the median layer thickness of the first set is not greater than the median layer thickness of the second set. The resin stream is then cast against a casting wheel or other casting surface in such a way that the first major surface is disposed against the casting wheel or other casting surface. Again, k can have the values of 10, 2, 1, or 0.5.

In another aspect of the present invention, a multilayer resin stream is provided in which substantially all of the layers having a layer thickness of less than k microns, k<10 (e.g., k=10, 2, 1, or 0.5), are disposed within 400 microns of a first surface of the resin stream. Such a resin stream is advantageous in that it may be used to make optical films in which the degradation of the thinnest layers may be conveniently controlled or eliminated by casting the first surface against a casting wheel or other surface. In a related embodiment, a resin stream is provided in which all of the thin optical layers are disposed within 400 microns of either surface of the resin stream. Again, such a resin stream is advantageous in that it may be used to make optical films in which the degradation of the thinnest layers may be conveniently controlled or eliminated by casting the both surfaces against opposing casting surfaces.

BRIEF DESCRIPTION OF THE DRAWINGS

FIG. 8 is a schematic illustration of the layer construction of the PEN/coPEN multilayer films of the present invention.

DETAILED DESCRIPTION OF THE PREFERRED EMBODIMENTS

In accordance with the method of the present invention, multilayer optical films having thin optical layers tuned to the blue region of the visible spectrum are made by casting these layers close (e.g., within 400 microns) to the casting wheel. By producing the films in this manner, degradation of layer integrity, which is especially pronounced in the thin optical layers, is avoided.

Figure 1:
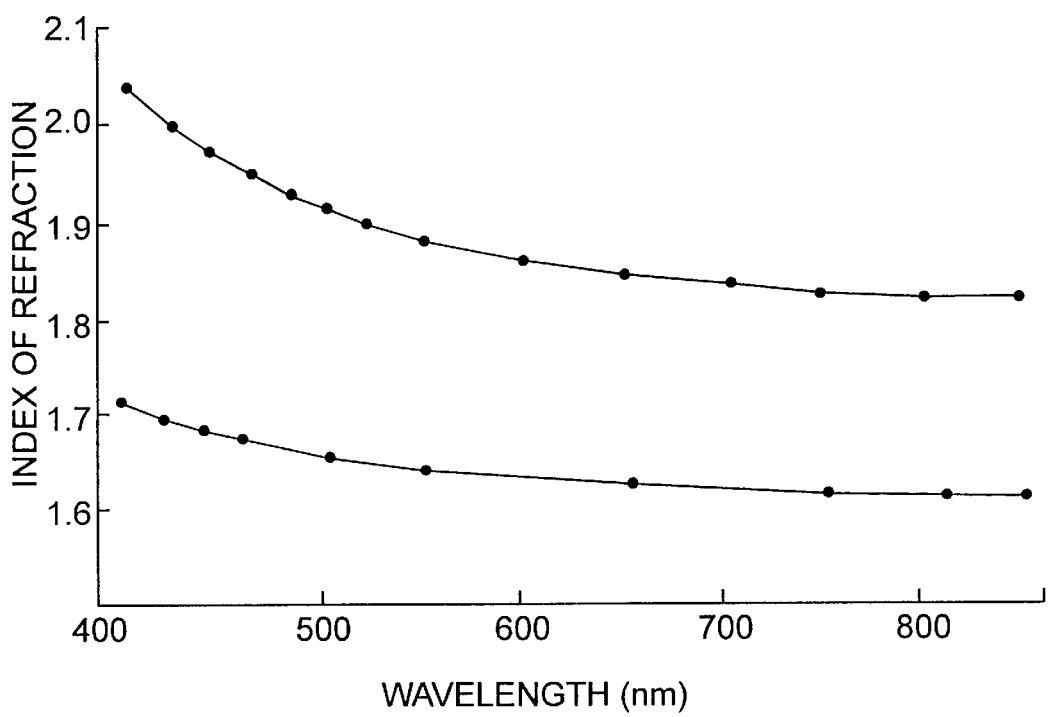
FIG. 1 is a graphical view illustrating the refractive index characteristics of PEN and coPEN monolayers.

Various materials may be used in accordance with the method of the present invention in making multilayer optical films. However, PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The differences in refractive indices associated with different in-plane axes exhibited by PEN and a 70-naphthalate/30-terephthalate copolyester (coPEN) for a 5:1 stretch ratio are illustrated in FIG. 1. In FIG. 1, the data on the lower curve represent the index of refraction of PEN in the transverse direction and the coPEN while the upper curve represents the index of refraction of PEN in the stretch direction. PEN exhibits a difference in refractive index of 0.25 to 0.40 in the visible spectrum. The birefringence (difference in refractive index) can be increased by increasing the molecular orientation. Although PEN has been specifically discussed above as the preferred polymer for the birefringent layer, polybutylene naphthalate is also a suitable material as well as other crystalline naphthalene dicarboxylic polyesters. The crystalline naphthalene dicarboxylic polyester should exhibit a difference in refractive indices associated with different in-plane axes of at least 0.05 and preferably above 0.20.

One factor that likely contributes to this reduced effective index differential of the PEN/coPEN multilayer is the inter diffusion of the two materials, as evidenced by TEM photographs showing density/compositional gradients between layers. This effect was examined in more detail in an experiment wherein the feedblock was oriented such that the thicker layers were extruded against the casting wheel. Although numerous methods exist for cooling and handling the extrudate from a die, the casting wheel referred to here always refers to the first temperature controlled roller or surface that contacts the extrudate. The thinner ("blue") layers should be extruded against the casting wheel, and the thicker ("red") layers should be on the air side. Layers closer to the casting wheel cool faster, and should exhibit reduced interactions. Heat transport to the air is extremely slow, and layers on the air side are still predominately cooled by the casting wheel.

As shown in Example 6, even the optical properties of the thicker layers can be affected by interdiffusion. For some applications, this can be undesirable. In such cases, a second chill roll (e.g., a chilled nip roll) can be applied to the otherwise "air" side to effect cooling from both sides of the film. This set-up would be particularly desirable where thin optical layers are disposed within about 400 microns of each surface of the extruded web.

Figure 2:
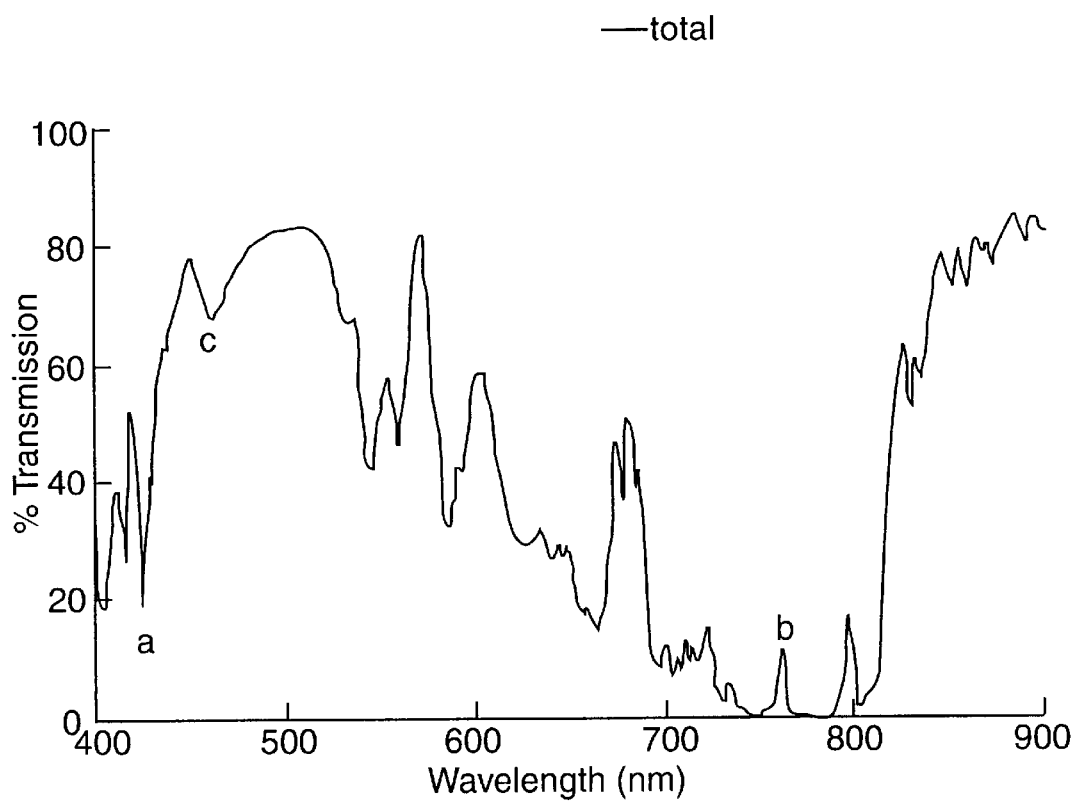
FIG. 2 is an optical spectrum illustrating the effects of interdiffusion in a PEN/coPEN multilayer film.
Figure 3:
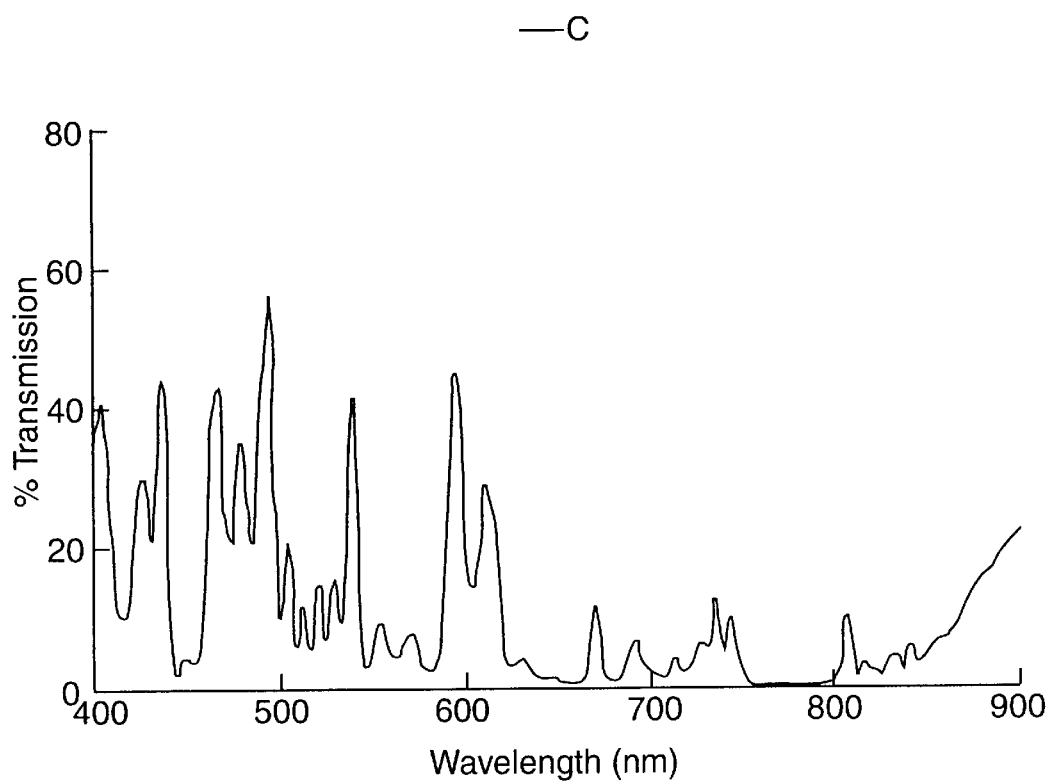
FIG. 3 is an optical spectrum illustrating the effects of interdiffusion in a PEN/coPEN multilayer film.

For the layers on the air side, their cooling rate depends greatly on the total thickness of any PBLs (Protective Boundary Layers), skin layers, and optical layers that exist. With thick PBLs, the thinner layers tuned to blue and green light and cast on the air side exhibited serious degradation in their optical performance as evidenced by their weak extinction spectrum shown in FIG. 2. With thinner PBLs, the extinction in the blue is stronger as shown in FIG. 3, but is not as good as the case where the thinner layers were cast toward the wheel side, shown in FIG. 4. These results are surprising, given that the difference in cooling times for the air side versus the casting wheel side of the film is only on the order of seconds. The film is on the casting wheel the same length of time in either case. Although diffusion is presented as the root cause of the difference, without wishing to be bound by theory, the different cooling time on the casting wheel may also allow nucleation of crystallites to a differing degree for the different cases presented.

The term "effective index differential" is used above because the magnitude of an extinction peak is determined by the index profile through the stack, not just by the peak to peak index differential in the optical stack. The complex details of strain induced crystallization, whereby, for example, the layers composed mainly of PEN are induced to exhibit a high index of refraction, can result in very nonlinear changes in index with respect to inter-diffused components of adjacent layers. For example, higher concentrations of PEN in coPEN resulting from interlayer diffusion can cause the coPEN to undergo strain induced crystallization upon stretching. As with PEN, this results in a large increase in index. Conversely, elements of coPEN diffusing into the PEN can alter the onset and subsequent development of strain-induced crystallization, for example, by increasing the required draw ratio at a given temperature or by decreasing the required temperature at a given draw ratio to achieve a desired level of crystallinity. At the higher stretch temperatures prescribed for PEN, such portions of the PEN layer contaminated with the inter-diffusing material may thus have a much lower index of refraction than other portions of the same PEN layer which are at a greater distance from the layer interface. The strain-induced crystallization process therefore produces very different optical results than isotropic or weakly oriented miscible polymer multilayer systems. Such isotropic systems have been described by several researchers. See, e.g., M. A. Barger and R. Ramanathan, Annual Technical Conference, Soc. of Plastics Engineers, 53rd conf., Vol. 2, 1699–1704 (1995); and G. Pollock et. al., J. of Appl. Polymer Science, Vol. 52, 163–176 (1994). The above referenced works explored diffusion as a method to eliminate the odd numbered higher order extinction peaks which are caused by a symmetric square wave index profile. In a simple quarter wave stack, the index profile is a symmetric square wave. Such a stack has the highest reflectance of any index profile, and produces only odd higher order peaks such as third, fifth, seventh etc. A rugate filter is one made with a sinusoidal index profile, and has no higher order peaks. Interdiffusion of two materials can produce a rounded square wave profile. Examples shown here illustrate that with strain induced crystallization involved, interdiffusion can create significant even numbered higher order peaks with a stack that was extruded to have a symmetric square wave index profile. Even numbered peaks, such as a second order peak are indicative of an asymmetric index wave profile.

Figure 5:
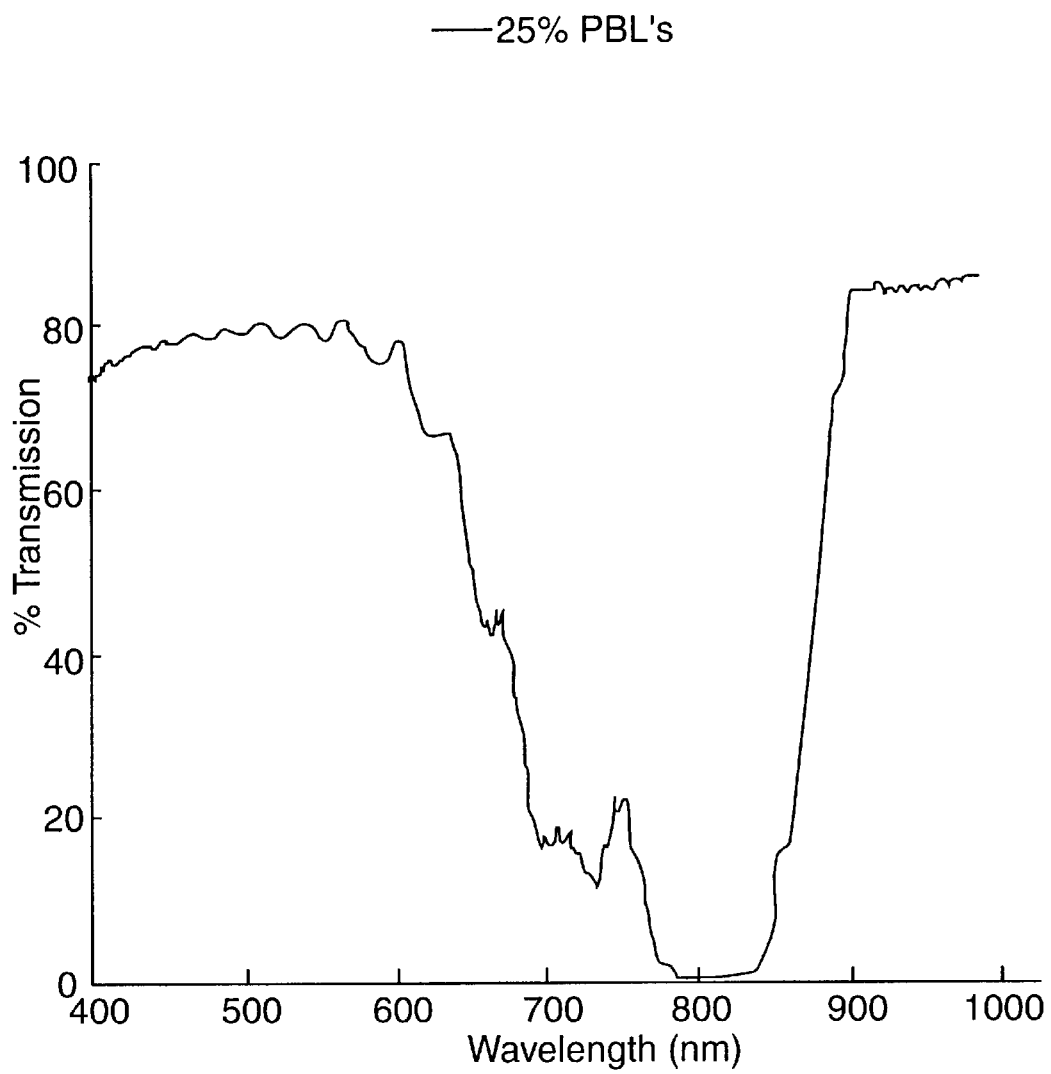
FIG. 5 is an optical spectrum illustrating the effects of interdiffusion in a PEN/coPEN multilayer film.
Figure 6:
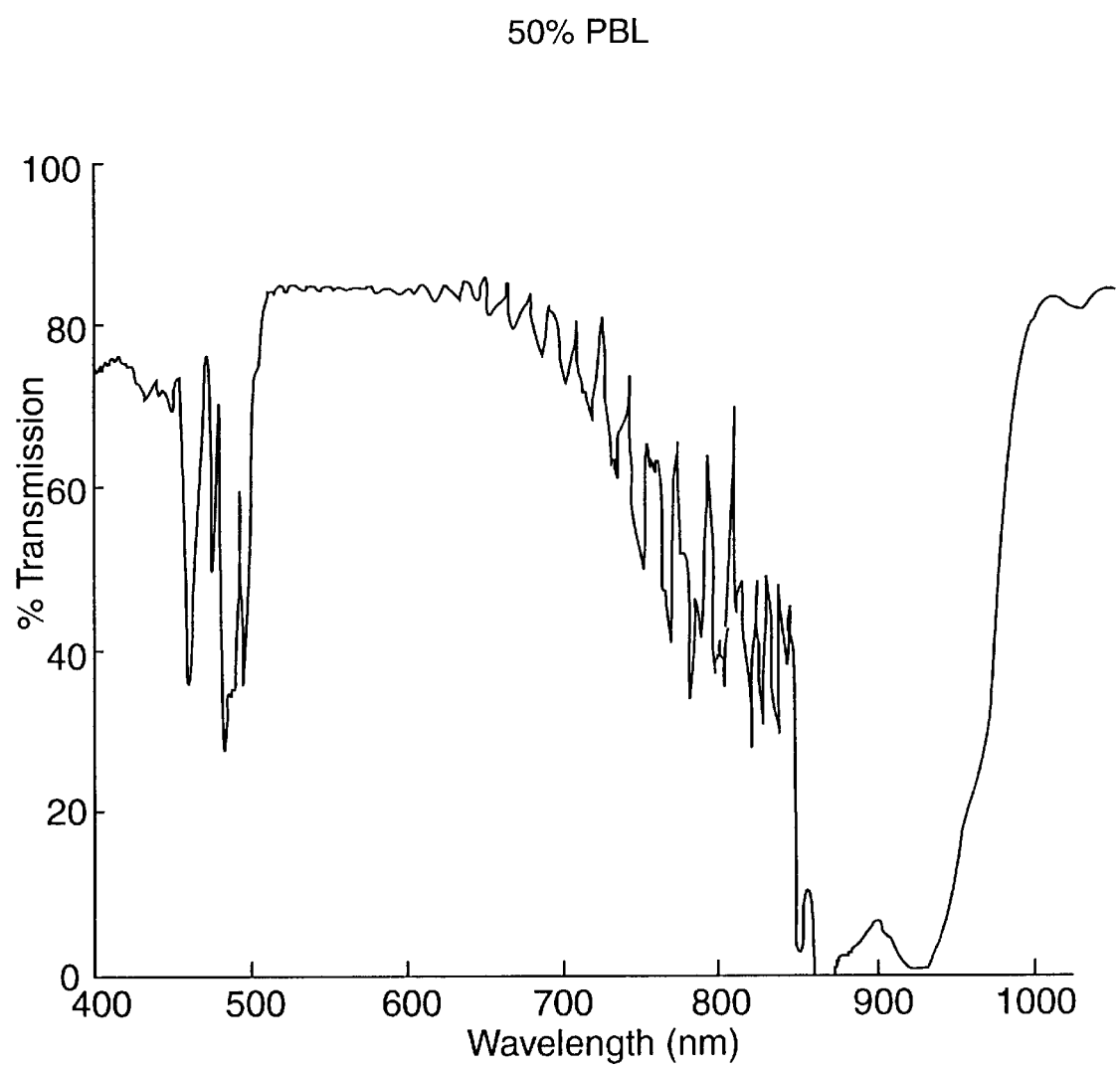
FIG. 6 is an optical spectrum illustrating the effects of interdiffusion in a PEN/coPEN multilayer film.

With a crystalline/noncrystalline multilayer stack such as PEN/coPEN wherein the high index is created via crystallizing and orienting one material, interdiffusion can change the position of the crystalline/non-crystalline interface, creating an asymmetric stack. In other words, the crystalline layer thickness could grow at the expense of the non-crystalline layer, or vice versa. The overall optical pair thickness will not substantially change, but the ratio of high index layer thickness to low index layer thickness can change dramatically. This unique optical construction exists because the major component of the coPEN is PEN, thereby making PEN partially miscible in coPEN and vice-versa. Therefore in a PEN/coPEN stack extruded to have optical layers ¼ wave thick for each material, the diffusion/reaction/stretching process can change this symmetry, resulting in a nonsymmetric optical stack, and the appearance of a second order reflectance peak. An example is illustrated with FIGS. 5 and 6, showing no 2nd order peak for fast quench samples, and significant 2nd order peaks for samples cooled more slowly. Higher order peaks would also be modified, but are not measurable here because of the 400 nm cutoff of the PEN system.

Pairs of high and low index layers are tuned to a particular wavelength by setting the sum of the product of the index of refraction at the particular wavelength in the given layer and the thickness of the given layer to half the particular wavelength. Thus each individual layer is roughly as thick as one quarter of the particular wavelength divided by the index of refraction at that particular wavelength, assuming that each layer in the half wave layer pair is about the same thickness. Because thinner layers are more susceptible to interdiffusion, having roughly similar layer thickness for each layer of a given pair minimizes these effects in a first approximation. Because strain-induced crystallizing layers may be more susceptible to these effects, having relatively thicker layers for such materials relative to their complementary lower index layers of the second material may be preferable in some cases. Thus for a layer pair with average index of 1.75 at 450 nm (e.g. a "blue" layer), the final layer thickness of each layer should be roughly 64 nm to tune to this wavelength. Given a final draw ratio of 6, the cast thickness of such layers should be roughly 384 nm (i.e. 0.384 microns).

A rounded asymmetric square wave profile will yield a lower reflectivity for the first order peak than a symmetric square wave profile having the same peak to peak index differential. The efficacy of any moderate amplitude profile (less than 0.3 peak to peak index differential) can be compared to that of a sine wave profile by calculating the first Fourier expansion coefficient of the index profile. For a sine wave, this value is 1.0. For a symmetric square wave, the value is 4/Pi.

Second order reflectance peaks (whether intentional or an artifact of the chemistry of the system) arising from layers tuned to produce a first order peak in the far red, could be used in place of or to supplement very thin extruded layers to reflect light at the blue/UV end of the spectrum. This can be particularly useful when the layers are so thin that they may be obscured by interfacial zones between the material layers with thicknesses comparable to the layers themselves. With proper optical design, high reflectivity in the blue or UV could be achieved without actually extruding ¼ wave thick layers tuned to those wavelengths. The magnitude of the second order peak can be adjusted either by extrusion rates of the two melt streams, or by temperature/time control of their interdiffusion to create a non-symmetric index waveform. Interdiffusion may be used to create varying degrees of a nonsymmetric index waveform throughout the optical stack by controlling the relative distance from the casting wheel for the different layers involved in the optical design.

The present invention is further illustrated by the following examples.

Most examples shown here involve samples made using a 209 layer feedblock and two film layer multipliers, with PBLs inserted before the first multiplier. Such a construction results in four "packets" of 209 optical layers, which are separated by protective boundary layers which also get multiplied. This film construction is illustrated in FIG. 8. The optics of an individual 209 layer packet can be measured after mechanically removing the adjacent optical packets from one or both sides of the packet of interest. This is possible with minimal damage to the optical layers of interest because of the relatively thick PBLs on either side of a given packet. The four individual packets are labeled Packet 1, Packet 2, etc. with 1 referring to the packet of thinnest optical layers, and 4 referring to the thickest layers. The multipliers were arranged such that, in all of the examples given here, packets 1 through 4 are tuned to ranges of monotonically increasing wavelength, i.e. blue to red. Packet 4 refers to the thickest optical layers regardless of whether it was cast toward the wheel or air side of the film. The actual thicknesses of all packets and PBL layers for the examples are summarized in Table 1. The distance from layers in a given packet to the casting wheel can be easily calculated from this table. Either PBL #1 or #5 is against the casting wheel.

TABLE 1

THICKNESS OF STRETCHED FILM

|  | microns | microns | microns | microns | microns | microns |
|---|---|---|---|---|---|---|
| skin #1 | 12.35 | 19.20 | 14.49 | 16.35 | 3.98 | 16.05 |
| optics #1 | 22.20 | 22.20 | 22.20 | 22.20 | 22.20 | 22.20 |
| skin #2 | 8.00 | 16.47 | 7.99 | 7.85 | 2.57 | 3.50 |
| optics #2 | 17.76 | 17.76 | 17.76 | 17.76 | 17.76 | 17.76 |
| skin #3 | 19.69 | 30.17 | 23.26 | 26.37 | 6.35 | 26.37 |
| optics #3 | 14.80 | 14.80 | 14.80 | 14.80 | 14.80 | 14.80 |
| skin #4 | 5.34 | 10.98 | 5.33 | 5.23 | 1.72 | 2.33 |
| optics #4 | 11.84 | 11.84 | 11.84 | 11.84 | 11.84 | 11.84 |
| skin #5 | 7.64 | 11.58 | 9.07 | 10.32 | 2.46 | 10.44 |
| Total Thickness (microns) | 119.62 | 155.00 | 126.74 | 132.73 | 83.69 | 125.29 |

| | THICKNESSES OF CAST WEB | | | | | |
|---|---|---|---|---|---|---|
| Stretch Ratio | 6.1 microns | 6.1 microns | 6.1 microns | 6.1 microns | 6.1 microns | 6.7 microns |
| PBL #5 | 75.33 | 117.12 | 88.39 | 99.72 | 24.30 | 107.56 |
| Packet #4 | 135.42 | 135.42 | 135.42 | 135.42 | 135.42 | 148.74 |
| PBL #4 | 48.83 | 100.46 | 48.75 | 47.90 | 15.70 | 23.43 |
| Packet #3 | 108.34 | 108.34 | 108.34 | 108.34 | 108.34 | 118.99 |
| PBL #3 | 120.13 | 184.03 | 141.90 | 160.89 | 38.75 | 176.66 |
| Packet #2 | 90.28 | 90.28 | 90.28 | 90.28 | 90.28 | 99.16 |
| PBL #2 | 32.55 | 66.97 | 32.50 | 31.93 | 10.47 | 15.62 |
| Packet #1 | 72.22 | 72.22 | 72.22 | 72.22 | 72.22 | 79.33 |
| PBL #1 | 46.60 | 70.64 | 55.32 | 62.94 | 15.03 | 69.97 |
| Distance of Thinnest layers to wheel (microns) | 46.60 | 874.84 | 717.81 | 643* | 419* | 69.97 |
| Total thickness (microns) | 730 | 945 | 773 | 810 | 511 | 839 |

*Mean distance of layers in Packet #4 from the casting wheel.

EXAMPLE 1

Thin layers on casting wheel side.

A coextruded film containing about 833 layers was produced by extruding a web onto a water chilled casting wheel and continuously orienting the film in a tenter. Polyethylene Naphthalate (PEN) with an Intrinsic Viscosity of 0.48 dl/g (60 wt. % phenol/40 wt. % dichlorobenzene) was delivered by one extruder at a rate of 75 pounds (34 kg) per hour and 70/0/30 coPEN (approximately 70 mol % 2,6 NDC and 30 mol % DMI) with an IV of 0.58 dl/g was delivered by another extruder at a rate of 85 pounds (39 kg) per hour. These meltstreams were directed to the feedblock to create the coPEN and PEN optical layers. The feedblock created 209 alternating layers of PEN and coPEN 70/0/30 with the two outside layers of coPEN serving as the protective boundary layers (PBLs) through the feedblock. An approximate linear gradient in layer thickness was produced by the feedblock for each material with the ratio of thickest to thinnest layers being about 1.30. After the feedblock a third extruder delivered the same 70/0/30 coPEN as symmetric PBLs (same thickness on both sides of the optical layer stream) at about 28 pounds (13 kg) per hour. The material stream passed though an asymmetric two times multiplier (U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. The material stream then passed through a second asymmetric two times multiplier with a multiplier ratio of about 1.5. After the second multiplier, a thick symmetric PBL was added at about 113 pounds (51 kg) per hour that was also fed from the third extruder. Then the material stream passed through a film die and onto a water cooled casting wheel using an inlet water temperature of about 13 degrees Celsius. The optical layers exhibited a generally monotonically increasing thickness profile from the casting wheel side to the air side of the film. The thinnest optical layers were closest to the casting wheel. The coPEN melt process equipment is maintained at about 530° F. (277° C.); the PEN melt process equipment is maintained at about 545° F. (285° C.); and the feedblock, multipliers, skin-layer modules, and die are maintained at about 540° F. (282° C.).

Figure 7:
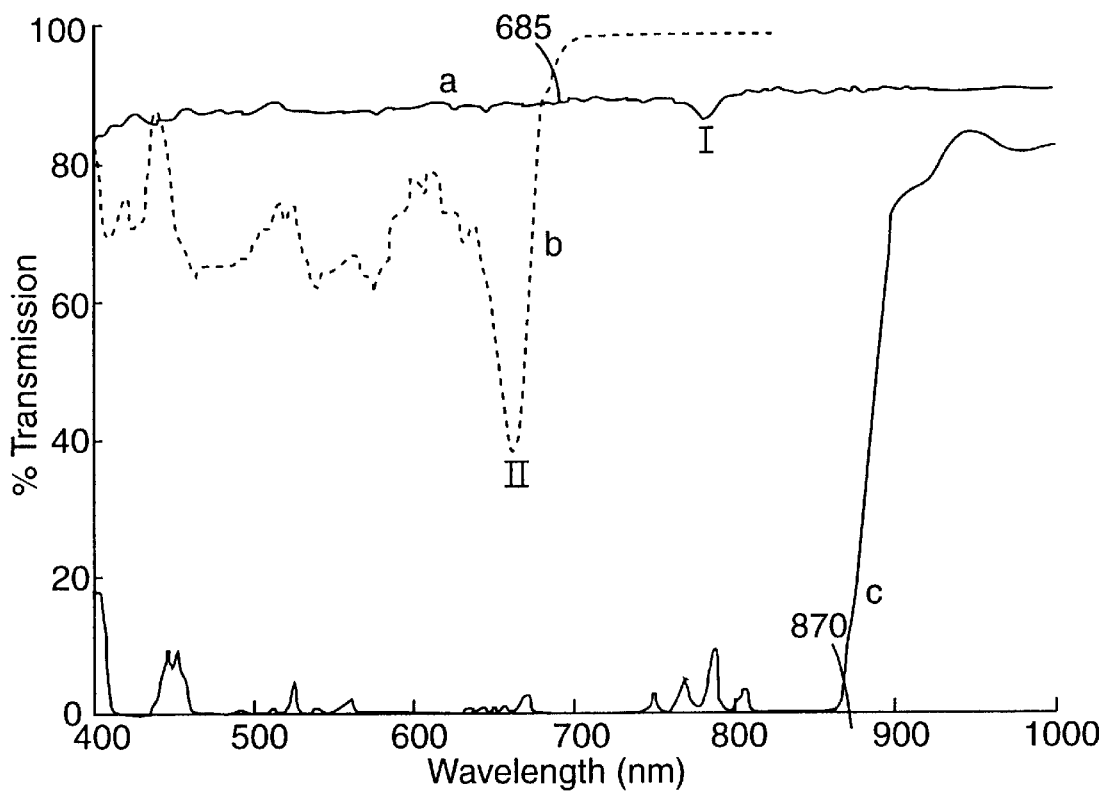
FIG. 7 is an optical spectrum illustrating the effects of interdiffusion in a PEN/coPEN multilayer film.

All stretching was done in a tenter. The film was preheated to about 303° F. (150° C.) in about 20 seconds and drawn in the transverse direction to a draw ratio of about 6.7 at a rate of about 25% per second. The finished film had a final thickness of about 125 microns. The optical spectra are shown in FIG. 7. Curve a is the transmission at normal incidence of light polarized parallel to the nonstretch direction. Curve b is the transmission of p-polarized light along this same direction, but at 60 degrees angle of incidence. Curve c gives the transmission at normal incidence of light polarized parallel to the stretch direction.

EXAMPLE 2

Thickest PBLs, thin layers on air side.

A coextruded film containing about 833 layers was produced by extruding web onto a chilled casting wheel and continuously orienting the film in a tenter. Polyethylene Naphthalate (PEN) with an Intrinsic Viscosity of 0.48 dl/g (60 wt. % phenol/40 wt. % dichlorobenzene) was delivered by one extruder at a rate of 79 pounds (36 kg) per hour and 70/15/15 coPEN (70 mol % 2,6 NDC, 15 mol % DMT and 15 mol % DMI) with an IV of 0.58 dl/g was delivered by another extruder at a rate of 86 pounds (39 kg) per hour. The feedblock created 209 alternating layers of PEN and coPEN 70/15/15 with the two outside coPEN optical layers serving as the PBLs through the feedblock. An approximate linear gradient in layer thickness was produced by the feedblock for each material with the ratio of thickest to thinnest layers being about 1.30. After the feedblock a third extruder delivered the same 70/15/15 coPEN as symmetric PBLs at about 136 pounds (62 kg) per hour. The material stream then passed though an asymmetric two times multiplier (U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. After the first multiplier, another symmetric PBL was added at about 82 pounds (37 kg) per hour that was also fed from the third extruder. The material stream then passed though a second asymmetric two times multiplier with a multiplier ratio of about 1.5. Then the material stream passed through a film die and onto a water cooled casting wheel using an inlet water temperature of about 16 degrees Celsius. The optical layers exhibited a generally monotonically decreasing thickness profile from the casting wheel side to the air side of the film. The thickest optical layers were closest to the casting wheel. All of the melt process equipment was maintained at about 555° F. (290° C.).

All stretching was done in a tenter The film was preheated to about 315° F. (157° C.) in about 20 seconds and drawn in the transverse direction to a draw ratio of about 6.1 at a rate of about 25% per second. The finished film had a final thickness of about 155 microns. The extinction spectrum for this polarizing film is shown in FIG. 2. Note the extreme loss of extinction at the shorter wavelengths. The narrow extinction peaks labeled "a" between 400 and 425 nm were shown to be first order peaks arising from the layers creating the first order peaks between 725 and 810 nm. This conclusion was reached after removing packet 4 from the film and noting the absence of the "a" peaks upon the removal of the layers creating the "b" extinction peaks. Also, upon removal of packet 4 as described above, peak "c" remained, as did a similar one at 420 nm. In summary, the optical extinction of this film from 400 to 600 nm is very weak.

EXAMPLE 3

Medium thickness PBLs, thin layers on air side.

A coextruded film containing about 831 layers was produced by extruding web onto a chilled casting wheel and continuously orienting the film in a tenter. Polyethylene Naphthalate (PEN) with an Intrinsic Viscosity of 0.48 dl/g (60 wt. % phenol/40 wt. % dichlorobenzene) was delivered by one extruder at a rate of 76 pounds (34 kg) per hour and 70/15/15 coPEN (70 mol % 2,6 NDC, 15 mol % DMT and 15 mol % DMI) with an IV of 0.58 dl/g was delivered by another extruder at a rate of 89 pounds (40 kg) per hour. The feedblock created 209 alternating layers of PEN and coPEN 70/15/15 with the two outside coPEN optical layers serving as the PBLs through the feedblock. An approximate linear gradient in layer thickness was produced by the feedblock for each material with the ratio of thickest to thinnest layers being about 1.30. After the feedblock a third extruder delivered the same 70/15/15 coPEN as symmetric PBLs at about 66 pounds (30 kg) per hour. The material stream then passed though an asymmetric two times multiplier (U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. After the first multiplier, another symmetric PBL was added at about 83 pounds (37 kg) per hour that was also fed from the third extruder. The material stream then passed though a second asymmetric two times multiplier with a multiplier ratio of about 1.5. Then the material stream passed through a film die and onto a water cooled casting wheel using an inlet water temperature of about 16 degrees Celsius. The optical layers exhibited a generally monotonically decreasing thickness profile from the casting wheel side to the air side of the film. The thickest optical layers were closest to the casting wheel. All of the melt process equipment was maintained at about 555° F. (290° C.).

All stretching was done in a tenter. The film was preheated to about 316° F. (158° C.) in about 20 seconds and drawn in the transverse direction to a draw ratio of about 6.1 at a rate of about 25% per second. The finished film had a final thickness of about 127 microns. Spectra for this film are shown in FIG. 3. Significant spectral leaks appear throughout the blue end of the spectrum, although not as serious as with the thickest PBLs as in FIG. 2. EXAMPLE 4

Medium PBLs, thin layers on wheel side.

A coextruded film containing about 833 layers was produced by extruding web onto a chilled casting wheel and continuously orienting the film in a tenter. Polyethylene Naphthalate (PEN) with an Intrinsic Viscosity of 0.48 dl/g (60 wt. % phenol/40 wt. % dichlorobenzene) was delivered by one extruder at a rate of 92 pounds (42 kg) per hour and 70/15/15 coPEN (70 mol % 2,6 NDC, 15 mol % DMT and 15 mol % DMI) with an IV of 0.58 dl/g was delivered by another extruder at a rate of 105 pounds (48 kg) per hour. The feedblock created 209 alternating layers of PEN and coPEN 70/15/15 with the two outside coPEN optical layers serving as the PBLs through the feedblock. An approximate linear gradient in layer thickness was produced by the feedblock for each material with the ratio of thickest to thinnest layers being about 1.30. After the feedblock a third extruder delivered the same 70/15/15 coPEN as symmetric PBLs at about 79 pounds (36 kg) per hour. The material stream then passed though an asymmetric two times multiplier (U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. After the first multiplier, another symmetric PBL was added at about 78 pounds (35 kg) per hour that was also fed from the third extruder. The material stream then passed though a second asymmetric two times multiplier with a multiplier ratio of about 1.5. Then the material stream passed through a film die and onto a water cooled casting wheel using an inlet water temperature of about 8 degrees Celsius. The optical layers exhibited a generally monotonically increasing thickness profile from the casting wheel side to the air side of the film. The thinnest optical layers were closest to the casting wheel. All of the melt process equipment was maintained at about 555° F. (290° C.).

Figure 4:
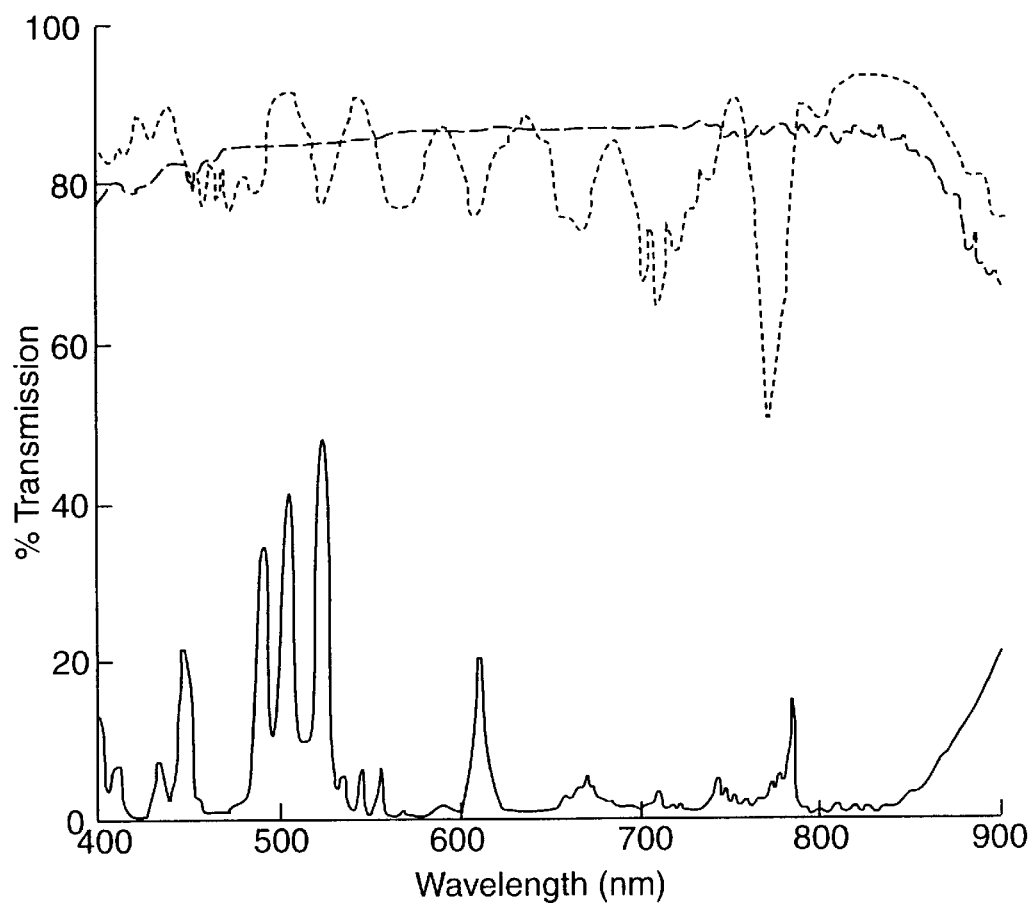
FIG. 4 is an optical spectrum illustrating the effects of interdiffusion in a PEN/coPEN multilayer film.

All stretching was done in a tenter. The film was preheated to about 315° F. (157° C.) in about 20 seconds and drawn in the transverse direction to a draw ratio of about 6.1 at a rate of about 25% per second. The finished film had a final thickness of about 120 microns. The spectra for this film are shown in FIG. 4. Note that the extinction peaks at 425 and 470 nm are comparable in minimum transmission to those at longer wavelengths. The large spectral leak around 500 nm was shown with transmission electron microscopy to be due to an insufficient layer distribution with thicknesses tuned to those wavelengths. The same spectral leak is identifiable in FIG. 3 between 460 and 500 nm. A comparison of FIG. 3 and 4 illustrates noticeably better extinction in FIG. 4 from 400 to 650 nm.

EXAMPLE 5

Thin PBLs, No second order peaks.

A coextruded film containing about 833 layers was produced by extruding web onto a chilled casting wheel and continuously orienting the film in a tenter. Polyethylene Naphthalate (PEN) with an Intrinsic Viscosity of 0.48 dl/g (60 wt. % phenol/40 wt. % dichlorobenzene) was delivered by one extruder at a rate of 92.5 pounds (42 kg) per hour and 70/15/15 coPEN (70 mol % 2,6 NDC, 15 mol % DMT and 15 mol % DMI) with an IV of 0.58 dl/g was delivered by another extruder at a rate of 104.5 pounds (47.5 kg) per hour. The feedblock created 209 alternating layers of PEN and coPEN 70/15/15 with the two outside coPEN optical layers serving as the PBLs through the feedblock. An approximate linear gradient in layer thickness was produced by the feedblock for each material with the ratio of thickest to thinnest layers being about 1.30. After the feedblock a third extruder delivered the same 70/15/15 coPEN as symmetric PBLs at about 25 pounds (11 kg) per hour. The material stream then passed though an asymmetric two times multiplier (U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. After the first multiplier, another symmetric PBL was added at about 25 pounds (11 kg) per hour that was also fed from the third extruder. The material stream then passed though a second asymmetric two times multiplier with a multiplier ratio of about 1.5. Then the material stream passed through a film die and onto a water cooled casting wheel using an inlet water temperature of about 8 degrees Celsius. The optical layers exhibited a generally monotonically increasing thickness profile from the casting wheel side to the air side of the film. The thinnest optical layers were closest to the casting wheel. All of the melt process equipment was maintained at about 555° F. (290° C.).

All stretching was done in a tenter. The film was preheated to about 320° F. (160° C.) in about 20 seconds and drawn in the transverse direction to a draw ratio of about 6.1 at a rate of about 25% per second. The finished film had a final thickness of about 84 microns. The three thinner optical packets were then removed from the film, leaving only packet 4 which contains the thickest optical layers, tuned to the infrared. Note in FIG. 5 that no second order extinction peaks are visible in the blue portion of the spectrum obtained from packet 4.

EXAMPLE 6

Thick PBLs, Induced second order peaks.

A coextruded film containing about 833 layers was produced by extruding web onto a chilled casting wheel and continuously orienting the film in a tenter. Polyethylene Naphthalate (PEN) with an Intrinsic Viscosity of 0.48 dl/g (60 wt. % phenol/40 wt. % dichlorobenzene) was delivered by one extruder at a rate of 92.5 pounds (42 kg) per hour and 70/15/15 coPEN (70 mol % 2,6 NDC, 15 mol % DMT and 15 mol % DMI) with an IV of 0.58 dl/g was delivered by another extruder at a rate of 104.5 pounds (47.5 kg) per hour. The feedblock created 209 alternating layers of PEN and coPEN 70/15/15 with the two outside coPEN optical layers serving as the PBLs through the feedblock. An approximate linear gradient in layer thickness was produced by the feedblock for each material with the ratio of thickest to thinnest layers being about 1.30. After the feedblock a third extruder delivered the same 70/15/15 coPEN as symmetric PBLs at about 78 pounds (45 kg) per hour. The material stream then passed though an asymmetric two times multiplier (U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. After the first multiplier, another symmetric PBL was added at about 118 pounds per hour that was also fed from the third extruder. The material stream then passed though a second asymmetric two times multiplier with a multiplier ratio of about 1.5. Then the material stream passed through a film die and onto a water cooled casting wheel using an inlet water temperature of about 8 degrees Celsius. The optical layers exhibited a generally monotonically increasing thickness profile from the casting wheel side to the air side of the film. The thinnest optical layers were closest to the casting wheel. All of the melt process equipment was maintained at about 555° F. (290° C.).

All stretching was done in a tenter. The film was preheated to about 320° F. (160° C.) in about 20 seconds and drawn in the transverse direction to a draw ratio of about 6.1 at a rate of about 25% per second. The finished film had a final thickness of about 133 microns. The three thinner optical packets were then removed from the film, leaving only packet 4 which contains the thickest optical layers, tuned to the infrared. Note in FIG. 6 that significant second order extinction peaks are visible in the blue portion of the spectrum obtained from packet 4. The only difference in processing this sample compared to example (FIG. 5) was the thicker PBLs in this example, which further distanced packet 4 from the water cooled casting wheel. Both examples (4 and 5) were extruded to have symmetric square wave index profiles, but FIG. 6 indicates that the distance from the casting wheel is important in maintaining this symmetry with film optics derived from strain-induced crystallization of one or more of the layer materials.

From the data in the Figures one can conclude that, in general, the thinnest layers should be cast closest to the casting wheel surface, and that the thicker layers, being more robust to the effects of interlayer diffusion, can be cast at greater distances to the wheel surface. Thinner layers are more susceptible to the effects of interdiffusion because, for a given interfacial width, that interfacial width is a much greater fraction of the total layer thickness for thinner layers than for the thicker layers. Therefore, unless an application requires the thinner layers to have lower optical reflecting power, the thinner layers should be cooled more quickly than the thicker layers.

Table I gives absolute PBL and optical packet thicknesses for the cast web. With a correlation of this information to the data in the Figures and the examples, the preferable distances of the thinnest PEN/coPEN layer pairs from the casting wheel surface can be determined. For example, the thinnest layers in Example 1 are approximately 70 microns from the casting wheel, being separated from the casting wheel only by the thickness of one PBL (PBL #1). The optical extinction given by these layers is acceptable, of the same magnitude as the extinction given by the thicker layers. In Examples 2 and 3, those distances become 875 and 718 microns respectively, which are much greater than in Example 1. These distances are too great to achieve the polarizer extinction values of Example 1 in the wavelength range of 400 to 500 nm. Even the thinnest layers of packet 3 in Example 2, which were cast at a distance of 461 microns from the wheel surface allow considerable transmission of light near 600 nm, as seen in FIG. 2. In general, it is found that the best results are obtained when the thinnest optical layers are be cast within about 400 microns of the casting surface.

The optical response of the layers in packet 4 of Examples 5 and 6 also provide information regarding the desired minimum distance of PEN/coPEN optical layers from the casting wheel surface. In Example 5, these layers are at a mean distance of 419 microns from the wheel surface, and exhibit no deleterious effects of interdiffusion on their optical performance. Example 6 shows that these same layers, at an average distance of 643 microns, produce a strong second order reflection peak. Layers ½ or ⅓ third of their thickness would have a proportionately greater asymmetry as discussed above, and would provide much lower reflectance in the first order peak. Since the optical absorbance of the entire PEN/coPEN stack is only on the order of 1 percent, the reflectivity here can be assumed to be given by 1−T, where T is the transmissivity. Therefore, a casting distance of 650 microns from the casting wheel is judged to be too great. From Example 5, a distance of 400 microns appears to allow sufficiently fast cooling of the optical layers to prevent a loss of optical reflecting power. Of course, this minimum distance is a function of residence time applicable to the interdiffusion process and on the details of feedblock and die design as well as on extrusion and coating rates. Conditions that increase this residence time decrease this minimum distance and vice-versa.

Thicker films are often required for mechanical strength, ease of processing, customer requirements, and so forth. If the required film thickness is greater than the sum of the optical layer thicknesses, film thickness may be increased by increasing the PBL thicknesses. Moreover, interior PBLs can be thickened rather than exterior PBLs (i.e., skin layers), allowing closer proximity of the thinnest layers to the casting wheel surface. However, when the total cast web thickness exceeds 400 microns, care must be taken to insure the rapid cooling of all the optical layers, especially the thinnest layers.

Various modifications of the present invention may be made without departing from the scope of the invention. For example, while the present invention has frequently been described with reference to resin streams having alternating layers of two resins, one skilled in the art will appreciate that the present invention is equally applicable to multilayer systems having more than two resins. Accordingly, the preceding description of the present invention is merely illustrative and is not intended to be limiting, and the scope of the present invention should be determined solely by reference to the appended claims.

What is claimed is:

1. A method for making a multilayer optical film, comprising the steps of:

providing a first and second resin;

extruding the first and second resins into a resin stream comprising a plurality of layers and having first and second major surfaces, wherein at least some of the plurality of layers comprise the first resin and at least some of the plurality of layers comprise the second resin, wherein the number of layers having a layer thickness of less than k microns and disposed within 400 microns of the first surface is greater than the number of layers having a layer thickness of less than k microns and disposed within 400 microns of the second surface, and wherein k≦10; and casting the resin stream against a casting surface such that the first major surface is in contact with the casting surface.

2. The method of claim 1, wherein k=10.

3. The method of claim 1, wherein k=2.

4. The method of claim 1, wherein k=0.5.

5. The method of claim 1, wherein the first resin comprises a polymer derived from at least one monomer selected from the group consisting of aromatic dicarboxylic acids and esters thereof.

6. The method of claim 5, wherein the monomer is naphthalene dicarboxylic acid.

7. The method of claim 1, wherein the second resin comprises a polymer derived from at least one monomer selected from the group consisting of naphthalene dicarboxylic acid, isophthalic acid, terephthalic acid, and the esters thereof.

8. The method of claim 7, wherein the monomer is a copolymer of naphthalene dicarboxylic acid and isophthalic acid.

9. The method of claim 1, wherein the resin stream is cast such that one surface of the resin stream is against the casting surface and the other surface is exposed to air.

10. The method of claim 1, wherein the casting wheel is cooled to less than the ambient temperature.

11. The method of claim 1, wherein the resin stream has a symmetric square wave index profile.

12. The method of claim 1, wherein the resin stream comprises a plurality of layer packets separated from each other by at least one boundary layer, and wherein the thicknesses of the layers in each layer packet change essentially monotonically in the direction of the layer thicknesses.

13. The method of claim 1, wherein the optical layers within the resin stream exhibit an essentially monotonically increasing layer thickness profile from the first surface to the second surface.

14. The method of claim 1, wherein the resin stream is heated to at least about 270° C. and wherein the casting wheel is cooled with a coolant having a temperature of less than about 20° C.

15. The method of claim 1, further comprising the step of:
stretching the cast resin stream.

16. The method of claim 1, wherein the casting surface is a casting wheel.

17. A method for making a multilayer optical film, comprising the steps of:

providing first and second resins;

extruding the first and second resins into a resin stream having a plurality of layers and having first and second major surfaces, wherein at least some of the plurality of layers comprise the first resin and at least some of the plurality of layers comprise the second resin, wherein at least some of the plurality of layers are of a first layer type having a layer thickness of less than k microns, where $k \leq 10$, and wherein at least some of the layers of the first layer type are disposed within 400 microns of the first surface and at least some of the layers of the first layer type are disposed within 400 microns of the second surface; and casting the resin stream such that the first major surface of the resin stream is in contact with a first casting surface and the second major surface is in contact with a second casting surface.

18. The method of claim 17, wherein k=10.
19. The method of claim 17, wherein k=2.
20. The method of claim 17, wherein k=0.5.
21. The method of claim 17, wherein the first and second casting surfaces are opposing surfaces.

22. A method for making a multilayer optical film, comprising the steps of:

providing first and second resins;

extruding the first and second resins into a resin stream having a plurality of layers and having first and second major surfaces, wherein at least some of the plurality of layers comprise a first resin and at least some of the plurality of layers comprise a second resin, wherein a first set having at least one member and consisting of the layers having layer thicknesses of less than k microns and disposed within 400 microns of the first surface has at least as many members as a second set consisting of the layers having layer thicknesses of less than k microns and disposed within 400 microns of the second surface, wherein $k \leq 10$, and wherein the median layer thickness of the first set is not greater than the median layer thickness of the second set; and casting the resin stream against a casting surface such that the first surface is in contact with the casting surface.

23. The method of claim 22, wherein k=10.
24. The method of claim 22, wherein k=2.
25. The method of claim 22, wherein k=0.5.

26. A method for making a multilayer optical film, comprising the steps of:

providing a first and second resin;

extruding the first and second resin into a resin stream having first and second major surfaces and comprising a plurality of layers, wherein at least some of said plurality of layers are of a first layer type having a layer thickness of less than k microns, wherein $k \leq 10$, and wherein substantially all of said of layers of said first layer type are disposed within 400 microns of the first surface; and casting the first major surface of the resin stream against a casting surface.

27. The method of claim 26, wherein k=10.
28. The method of claim 26, wherein k=2.
29. The method of claim 26, wherein k=0.5.

30. A method for making a multilayer optical film, comprising the steps of:

providing a first and second resin;

extruding the first and second resins into a resin stream comprising a plurality of layers and having first and second major surfaces, wherein at least some of the plurality of layers comprise the first resin and at least some of the plurality of layers comprise the second resin, and wherein at least some of the plurality of layers are of a first layer type having a layer thickness of less than k microns, wherein $k \leq 10$; and bringing the resin stream into contact with at least one casting surface, such that substantially all of the layers of the first layer type are disposed within about 400 microns of at least one casting surface.

31. The method of claim 30, wherein substantially all of the layers of the first layer type are disposed within about 400 microns of the first major surface.

32. The method of claim 31, wherein k=1.
33. The method of claim 31, wherein k=0.5.

34. A method for making a multilayer optical film, comprising the steps of:

providing a first and second resin;

extruding the first and second resin into a resin stream comprising a plurality of layers and having first and second major surfaces, wherein at least some of the plurality of layers comprise the first resin and at least some of the plurality of layers comprise the second resin, wherein at least some of the plurality of layers are of a first layer type having a layer thickness of less than 1 micron, and wherein the portion of the resin stream within 400 microns of the second major surface is substantially devoid of layers of the first layer type; and casting the resin stream such that the first major surface of the resin stream is in contact with a casting surface.

* * * * *